United States Patent
Kaneko

(10) Patent No.: US 9,632,517 B2
(45) Date of Patent: Apr. 25, 2017

(54) AIR CONDITIONER

(71) Applicant: Hideyuki Kaneko, Tokyo (JP)

(72) Inventor: Hideyuki Kaneko, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 476 days.

(21) Appl. No.: 13/849,584

(22) Filed: Mar. 25, 2013

(65) Prior Publication Data

US 2013/0297077 A1   Nov. 7, 2013

(30) Foreign Application Priority Data

May 2, 2012   (JP) .................... 2012-105369

(51) Int. Cl.
G05B 13/00 (2006.01)
G05B 15/00 (2006.01)
G05D 23/00 (2006.01)
G05D 23/19 (2006.01)
F24F 11/00 (2006.01)

(52) U.S. Cl.
CPC ............ *G05D 23/19* (2013.01); *F24F 11/006* (2013.01); *F24F 11/0009* (2013.01); *F24F 2011/0061* (2013.01); *F24F 2011/0063* (2013.01); *F24F 2011/0064* (2013.01)

(58) Field of Classification Search
CPC .... G05D 23/19; F24F 11/0009; F24F 11/006; F24F 2011/0064; F24F 2011/0061; F24F 2011/0063
USPC ................................... 700/276–278
See application file for complete search history.

(56) References Cited

U.S. PATENT DOCUMENTS

| 3,289,746 A | 12/1966 | Kline |
| 2004/0024483 A1* | 2/2004 | Holcombe ............ G06Q 30/02 700/122 |
| 2005/0097618 A1* | 5/2005 | Arling ................. H04L 12/2805 725/114 |
| 2005/0278069 A1* | 12/2005 | Bash .................... F24F 11/0009 700/276 |

(Continued)

FOREIGN PATENT DOCUMENTS

| EP | 0730124 A2 | 9/1996 |
| EP | 1335166 A2 | 8/2003 |

(Continued)

OTHER PUBLICATIONS

Corrected European search report mailed Nov. 11, 2013 in the corresponding EP application No. 13164921.2-1602.

(Continued)

*Primary Examiner* — Ziaul Karim
(74) *Attorney, Agent, or Firm* — Posz Law Group, PLC

(57) ABSTRACT

An air conditioner includes: an air-conditioning control unit; a data read and write unit; a data control unit; and an operation unit. The air-conditioning control unit controls air-conditioning running based on running information; the data read and write unit to which a storage medium configured to store therein data can be removably connected; the data control unit transfers the running information and the operation setting information transmitted from the air-conditioning control unit to the data read and write unit; and the operation unit can input the operation setting information for performing an operation of the air-conditioning running.

5 Claims, 5 Drawing Sheets

(56) References Cited

U.S. PATENT DOCUMENTS

| | | | |
|---|---|---|---|
| 2006/0026972 A1* | 2/2006 | Masui | F24F 11/006 62/127 |
| 2011/0046792 A1 | 2/2011 | Imes et al. | |
| 2012/0054124 A1 | 3/2012 | Rodrigues | |
| 2012/0130547 A1* | 5/2012 | Fadell et al. | 700/276 |
| 2012/0273581 A1* | 11/2012 | Kolk | F24F 11/006 236/91 D |
| 2013/0226320 A1* | 8/2013 | Berg-Sonne et al. | 700/90 |
| 2014/0277769 A1* | 9/2014 | Matsuoka | G06Q 50/06 700/278 |
| 2014/0316584 A1* | 10/2014 | Matsuoka | G05D 23/1917 700/278 |

FOREIGN PATENT DOCUMENTS

| | | |
|---|---|---|
| EP | 2037191 A1 | 3/2009 |
| GB | 986314 A | 3/1965 |
| JP | 58-075641 A | 5/1983 |
| JP | H05-332591 A | 12/1993 |
| JP | 09-229451 A | 9/1997 |
| JP | 09-257268 A | 9/1997 |
| JP | H10-160229 A | 6/1998 |
| JP | 11-237068 A | 8/1999 |
| JP | 2989407 B2 | 10/1999 |
| JP | 2001-117797 A | 4/2001 |
| JP | 2003-240317 A | 8/2003 |
| JP | 2004-291780 A | 10/2004 |
| JP | 2006-349241 A | 12/2006 |

OTHER PUBLICATIONS

Office Action mailed Mar. 3, 2015 issued in corresponding JP patent application No. 2012-105369 (and English translation).

Extended European search report mailed Aug. 9, 2013 in the corresponding EP application No. 13164921.2-1602.

* cited by examiner

AIR CONDITIONER

BACKGROUND OF THE INVENTION

1. Field of the Invention

The present invention relates to an air conditioner, and more particularly to an air conditioner to which a removable storage medium is connectable.

2. Description of the Related Art

In a conventional air conditioner, running information during running of the air conditioner and setting information set by an operator is temporarily stored in a random access memory (RAM) of a controller microcomputer, and then necessary information is intentionally stored in a nonvolatile memory such as an electrically erasable and programmable read only memory (EEPROM), which maintains the stored information unless it is arbitrarily initialized (see Japanese Patent No. 2989407, page 1).

There is another conventional air conditioner that is driven based on control information read from an external storage device that has running information stored therein in advance (see Japanese Patent Application Laid-open No. 9-229451, page 2).

However, in the air conditioner described in Japanese Patent No. 2989407, the nonvolatile memory such as the EEPROM has a limited memory capacity, and it is not easy to retrieve data from the nonvolatile memory. In addition, when a certain board fault occurs on a control board, the running information stored in the nonvolatile memory such as the EEPROM is initialized due to replacement of the board, resulting in a problem of taking time to recover a state of the air conditioner before the fault.

Furthermore, in the air conditioner described in Japanese Patent Application Laid-open No. 9-229451, the control information read out from the external storage device is generalized information in a certain condition, rather than information indicating a running condition of an individual device, and therefore an initialization operation of the control information is also required when replacement of the board or the like is performed.

The present invention has been made in view of the above problems, and an object of the present invention is to provide an air conditioner that can be easily recovered, even when replacement of a board or the like is performed due to a certain fault, a state of the air conditioner before the fault.

SUMMARY OF THE INVENTION

It is an object of the present invention to at least partially solve the problems in the conventional technology.

An air conditioner according to an aspect of the present invention includes: an air-conditioning control unit that controls air-conditioning running based on running information that is action information during running and operation setting information; a data read and write unit to which a storage medium configured to store therein data can be removably connected, and that can write running information and operation setting information transmitted from the air-conditioning control unit in the storage medium during air-conditioning running and can read running information and operation setting information stored in the storage medium before stop of running, from the storage medium when restarting air-conditioning running; a data control unit that transfers the running information and the operation setting information transmitted from the air-conditioning control unit to the data read and write unit to be written in the storage medium, or transfers, to the air-conditioning control unit, the running information and the operation setting information stored in the storage medium before stop of running and read from the storage medium by the data read and write unit; and an operation unit that can input the operation setting information for performing an operation of the air-conditioning running.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an air conditioner according to the present invention will be explained below in detail with reference to the accompanying drawings. The present invention is not limited to the embodiments.

First Embodiment

Figure 1:
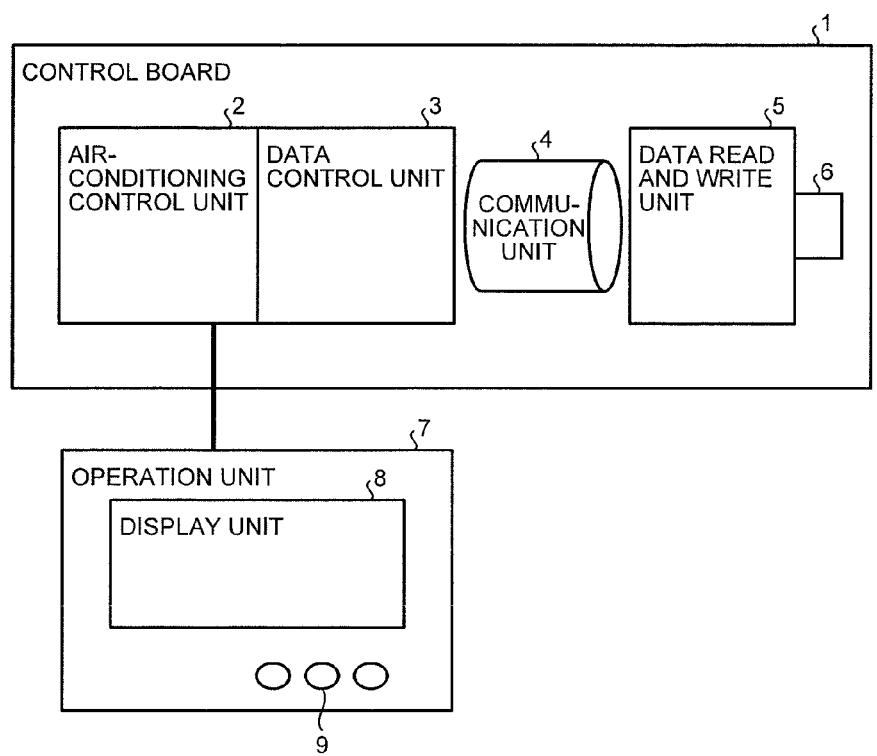
FIG. 1 is a block diagram of a configuration of an air conditioner according to a first embodiment of the present invention.

FIG. 1 is a block diagram of a configuration of an air conditioner according to a first embodiment of the present invention. As illustrated in FIG. 1, the air conditioner includes a control board 1 and an operation unit 7 connected to the control board 1. An air-conditioning control unit 2, a data control unit 3, a communication unit 4, and a data read and write unit 5 are mounted on the control board 1.

The air-conditioning control unit 2 plays a role of controlling the overall action of the air conditioner. The air-conditioning control unit 2 also plays a role of managing running information of the air conditioner and setting information set by an operator. The air-conditioning control unit 2 controls the air-conditioning running based on the running information, which is action information during air-conditioning running, and the setting information set by the operator.

The data control unit 3 collects and organizes the running information and the setting information managed by the air-conditioning control unit 2, and transmits the collected and organized information to the data read and write unit 5 via the communication unit 4. Reversely, the data control unit 3 also plays a role of receiving information from the data read and write unit 5 via the communication unit 4, organizing the received information, and transmitting the organized information to the air-conditioning control unit 2. The air-conditioning control unit 2 and the data control unit 3 do not have to be physically separated from each other, but may be configured in a physically integrated manner being logically divided inside an integrally formed unit. The communication unit 4 performs transmission and reception of data between the data control unit 3 and the data read and write unit 5.

A removable storage medium 6 can be mounted to the data read and write unit 5 and the data read and write unit 5 can write the data received from the data control unit 3 in the removable storage medium 6. Reversely, the data read and write unit 5 may read out data from the removable storage medium 6, and transmits the read data to the data control unit 3.

The operation unit 7 transmits the setting information to the air-conditioning control unit 2 when the operator wants to arbitrarily operate the action of the air conditioner or the operation unit 7 receives the running information of the air conditioner from the air-conditioning control unit 2. A display unit 8 displays necessary information so that the operator can select desired contents, or the display unit 8 displays the running information of the air conditioner received from the air-conditioning control unit 2. An operation button 9 is for selecting contents to be set or for selecting contents to be displayed on the display unit 8 by the operator.

Figure 2:
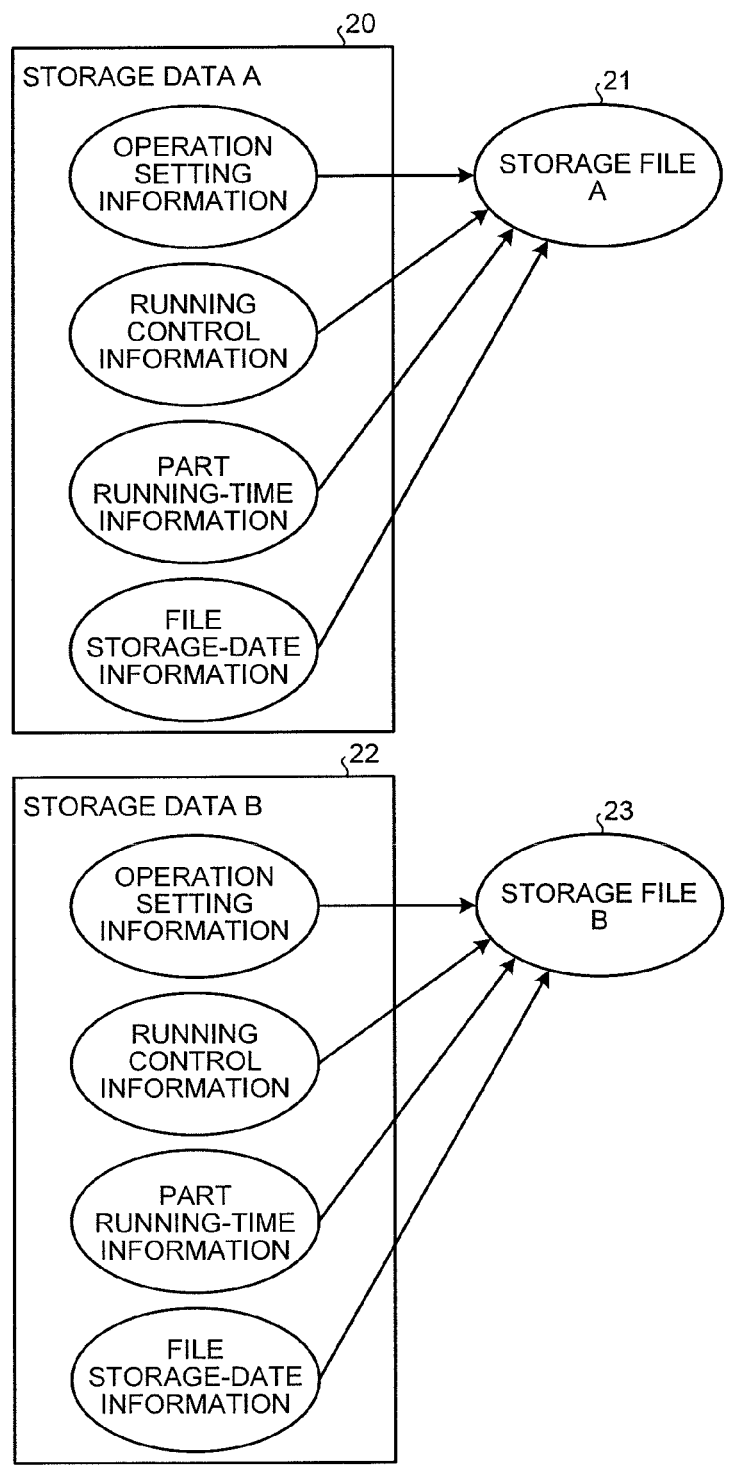
FIG. 2 depicts details of storage data in an air-conditioning control unit according to the first embodiment.

FIG. 2 depicts details of storage data in the air-conditioning control unit 2 according to the first embodiment. Storage data A 20 is information collected by the air-conditioning control unit 2, which is an example of information that is updated during the air conditioner is running. Operation setting information is a record of a change history of the setting information input by the operator via the operation unit 7 including, for example, a setting temperature, a wind direction, a wind speed, and schedule setting. Running control information is control information that is updated as needed by the air-conditioning control unit 2 based on the setting information received from the operation unit 7, system information of the air conditioner, sensor information of a sensor attached to the air conditioner, and the like. Part running-time information is information on the running time of a control target part, which is attached to the air conditioner, the number of on-off times of a contact, and the like. These pieces of information (operation setting information, running control information, and part running-time information) are stored as needed in a nonvolatile memory (not shown) that is built in the air-conditioning control unit 2. Therefore, the air-conditioning control unit 2 does not need to collect these pieces of information again when restarting running from a state of stop of running, but can restart running after acquiring necessary information by referring to the contents stored in the built-in nonvolatile memory. A storage file A 21 is the storage data A 20 in a file format attached with file storage-date information. A storage file B 23 is stored at a file storing timing different from that of the storage file A 21, and includes storage data B 22. Similarly to the storage data A 20, the storage data B 22 includes operation setting information, running control information, part running-time information, and file storage-date information (including date and time). The file storing timing may be determined at an interval that is set in advance in the air-conditioning control unit 2, or may be arbitrarily set by the operator. The storage files A 21 and B 23 are created by the data control unit 3 based on the storage data A 20 and B 22 sent out from the air-conditioning control unit 2, respectively.

Figure 3:
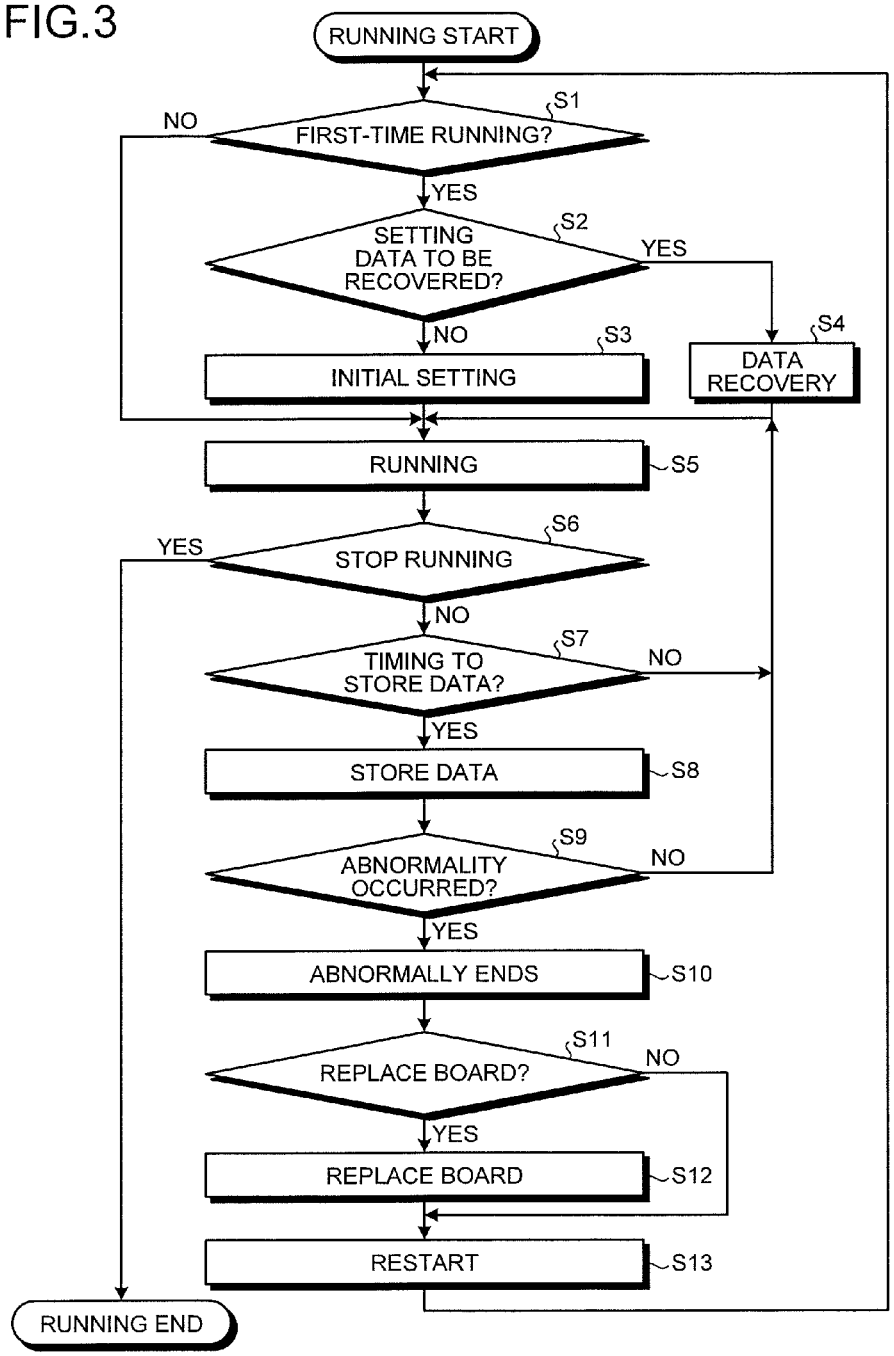
FIG. 3 is a flowchart of a running action of the air conditioner according to the first embodiment.

FIG. 3 is a flowchart of a running action of the air conditioner according to the first embodiment. Immediately after start of running, it is determined whether the running is the first-time running after installing the air conditioner (Step S1). When it is determined that the running is the first-time running (YES at Step S1), it is checked whether to recover setting data (Step S2). When the setting data is not to be recovered or there is no storage file for recovering the data (NO at Step S2), initial setting is performed (Step S3). Setting contents in this case include, for example, contents related to a system configuration of the air conditioner and contents related to scheduled running. When performing recovery of the setting data (Step S4), it is a case where there is a storage file (see FIG. 2) for the data recovery. However, it is assumed, for example, that there is no storage file at this stage, which will be explained later. When it is not the first-time running (NO at Step S1), information accumulated in previous times of running is stored in the nonvolatile memory of the air-conditioning control unit 2 as the storage data and accordingly running is started based on the stored information.

During running (Step S5), the running is continued until end of running is specified arbitrarily by the operator or by schedule setting (Step S6). When the ending of running is selected at Step S6 (YES at Step S6), the air conditioner normally ends the running. When the running is continued (NO at Step S6), the air-conditioning control unit 2 regularly checks a timing for storing data (Step S7). The timing (interval) for storing the data can be set, for example, by the operator in advance. That is, the operation unit 7 can transmits, to the air-conditioning control unit 2, information for setting an interval at which the air-conditioning control unit 2 automatically transmits the storage data to the data control unit 3. When it is not the timing for storing the data (NO at Step S7), the process returns to Step S5. At the timing for storing the data (YES at Step S7), the air-conditioning control unit 2 transmits the storage data to the data control unit 3. The data control unit 3 organizes the storage data in a storage file (see FIG. 2), and then transmits the storage file to the data read and write unit 5 via the communication unit 4. The data read and write unit 5 writes the received file in the removable storage medium 6 (Step S8). In this manner, the storage data transmitted from the air-conditioning control unit 2 to the data control unit 3, for example, at a regular interval and in an automatic manner is stored in the removable storage medium 6 as the storage file.

The air-conditioning control unit 2 detects an occurrence of an abnormality as needed while continuing the running (Step S9). When there is no abnormality (NO at Step S9), the running is continued as it is to repeat processes at Steps S5 to S8. When an abnormality occurs for any reason (YES at Step S9), the air conditioner abnormally ends the running (Step S10).

When there is an abnormality, the running is restarted after examining and repairing a place that caused the abnormality. Particularly, when the control board 1 is the cause of the abnormality, the repair is normally performed by replacing the control board 1 with another one. That is, it is determined whether board replacement is needed (Step S11), and when it is determined that the board replacement is needed (YES at Step S11), the board replacement is performed (Step S12). When the control board 1 is replaced with a new one, it is hard to carry over the stored contents in the nonvolatile memory in the air-conditioning control unit 2 to the new control board 1. Even when the board replacement is not needed (NO at Step S11), the stored contents in the nonvolatile memory are cleared with elimination of the abnormal state. In these cases, it is required to perform the initial setting again when restarting the running (Step S3). Therefore, when the control board 1 is replaced, the removable storage medium 6 is removed from the control board 1 before replacement and then mounted on the control board 1 after replacement. When the control board 1 is not replaced, the removable storage medium 6 is remained mounted on the control board 1. When the repair of the abnormal state is completed, the air conditioner is restarted (Step S13). After the restart, Steps S1 and S2 are performed again, and when the recovery of the setting data is selected (YES at Step S2), the air-conditioning control unit 2 performs the data recovery by using the storage file stored in the removable storage medium 6 (Step S4), and then the running is continued.

Figure 4:
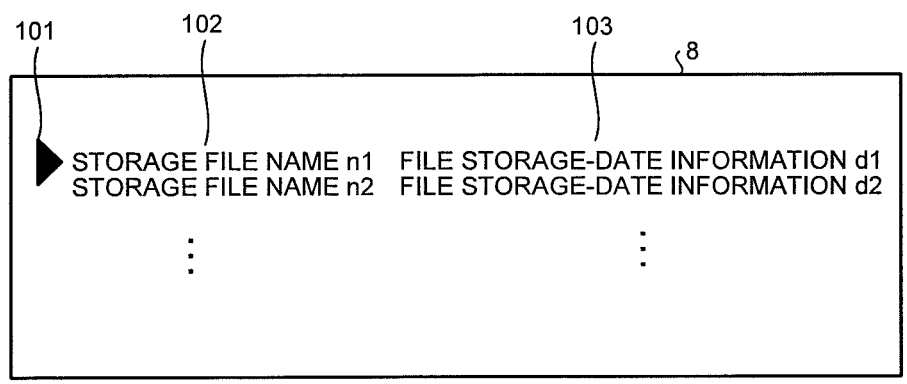
FIG. 4 is an example of contents displayed on a display unit when recovering data.

FIG. 4 is an example of contents displayed on the display unit 8 when recovering the data. One set or a plurality of sets of a storage file name 102 that can be recovered and file storage-date information 103 is displayed on the display unit 8. The operator can start data recovery by selecting a file to be recovered with a guide of a file select cursor 101 by using the operation button 9 (Step S2 in FIG. 3). The operation unit 7 transmits, to the air-conditioning control unit 2, an instruction for causing the data read and write unit 5 to read the storage file selected by the operator, which is stored in the removable storage medium 6. The air-conditioning control unit 2 then causes the data read and write unit 5 to read the storage file selected by the operator, which is stored in the removable storage medium 6.

When the recovery is started (Step S4 in FIG. 3), the data read and write unit 5 reads out the storage data in the storage file selected from the removable storage medium 6, and transmits the storage data to the data control unit 3 via the communication unit 4. The data control unit 3 organizes the received data and then transmits the organized data to the air-conditioning control unit 2. The air-conditioning control unit 2 starts running based on the received data (running setting information). A part of the storage data is also transmitted to the operation unit 7.

As described above, in the air conditioner according to the first embodiment, when restarting the air conditioner after an occurrence of an abnormality that accompanies board replacement or initialization of the nonvolatile memory, the storage data that is stored in the removable storage medium 6 in advance is read, and the running information (running control information and part running-time information) and operation setting information that is stored before the occurrence of the abnormality is acquired from the storage data, by which the setting data can be recovered. Therefore, it is possible to easily recover the state before the occurrence of the abnormality. In this manner, according to the first embodiment, even when board replacement is performed due to an occurrence of a certain abnormality (including a fault), it is possible to easily recover the state before the occurrence of the abnormality, and therefore the maintainability of the air conditioner is enhanced.

Second Embodiment

Figure 5:
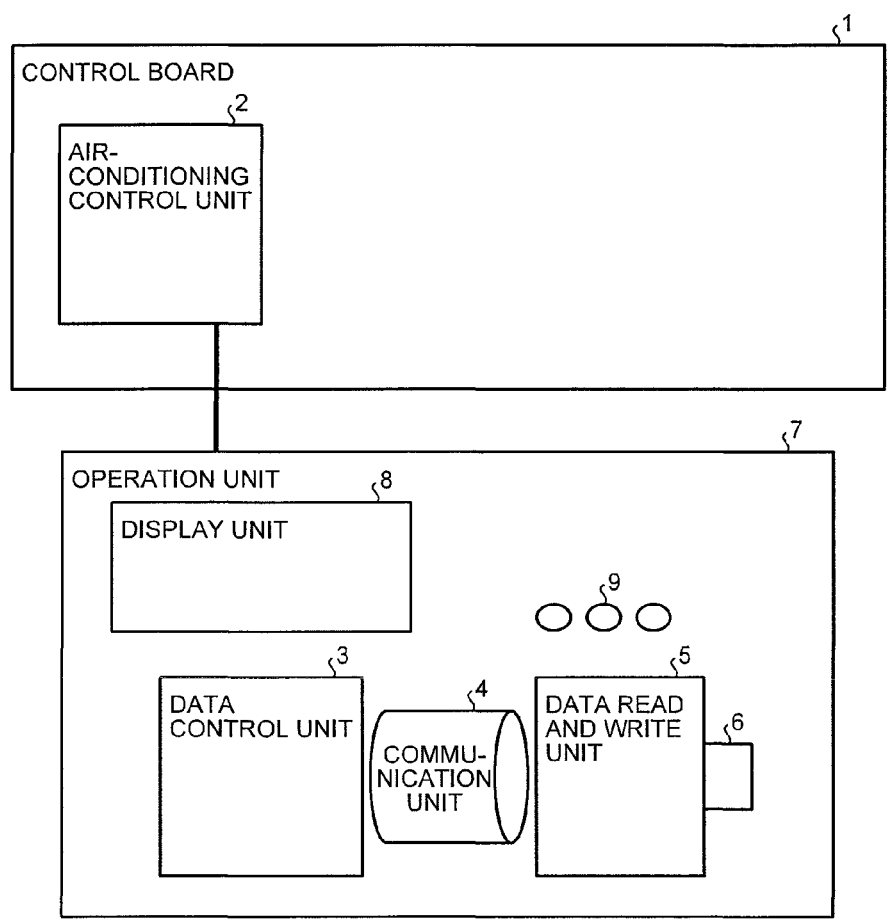
FIG. 5 is a block diagram of a configuration of an air conditioner according to a second embodiment of the present invention.

FIG. 5 is a block diagram of a configuration of an air conditioner according to a second embodiment of the present invention. As illustrated in FIG. 5, while the second embodiment includes constituent elements similar to those of the first embodiment, the second embodiment is different from the first embodiment in that the data control unit 3, the communication unit 4, and the data read and write unit 5, which are provided on the control board 1 according to the first embodiment, are provided on the operation unit 7 in the second embodiment. Therefore, the removable storage medium 6 is mounted on the data read and write unit 5 that is provided on the operation unit 7. Because detailed explanations and operations of individual constituent elements are identical to those described in the first embodiment, explanations thereof will be omitted.

According to the second embodiment, when it is possible to repair an abnormality without performing the board replacement at the time of an occurrence of an abnormality, it does not necessitate removal of the removable storage medium 6 from the control board 1 when recovering the state before the occurrence of the abnormality by using the data stored in the removable storage medium 6. Therefore, the maintainability of the air conditioner can be further enhanced.

According to the present invention, it is configured to enable the running information and the operation setting information to be stored in a removable storage medium and to be read from the removable storage medium as necessary, and therefore, even when replacement of the board is performed due to a certain fault, a state of the air conditioner before the replacement of the board can be easily recovered, and consequently the maintainability of the air conditioner is enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air conditioner comprising:
an air-conditioning control unit that controls air-conditioning running based on running information and operation setting information stored in a nonvolatile memory of the air-conditioning control unit, the running information is action information during running;
a data read and write unit to which a storage medium configured to store therein data is physically and removably connected, the data read and write unit writes the running information and the operation setting information transmitted from the air-conditioning control unit in the storage medium and reads the running information and the operation setting information stored in the storage medium from the storage medium;
a data control unit that, during air-conditioning running, transfers, at a pre-determined periodic timing, the running information and the operation setting information transmitted from the air-conditioning control unit to the data read and write unit to be written in the storage medium; and
an operation unit that inputs the operation setting information for performing an operation of the air-conditioning running,
the air-conditioning control unit is mounted on a same control board as the data read and write unit and the storage medium which stores data for the air-conditioning control;
the operation unit that inputs the operation setting information is separated from the control board on which the air-conditioning control unit is mounted;
wherein
when the air-conditioning running is re-started after being stopped due to board replacement or initialization of the nonvolatile memory,
the air-conditioning control unit causes, responsive to the re-start or initialization, the data read and write unit to read the running information and the operation setting information which was stored at the periodic timing in the storage medium before running was stopped, then the data control unit transfers, responsive to the re-start or initialization, after the data read and write unit reads the running information and the operation setting information which was stored before running was stopped, to the air-conditioning control unit, the running information and the operation setting information that are from before the running was stopped and that are read from the storage medium by the data read and write unit, then, responsive to the re-start or initialization, after the running information and the operation setting information that are from before the running was stopped are transferred to the air-conditioning control unit, the air-conditioning control unit runs the air-conditioning control based on the running information and the operation setting information that are from before the running was stopped and that are received from the data control unit, wherein the air-conditioning control unit automatically transmits the running information and the operation setting information to the data control unit on a regular basis, wherein the operation unit transmits, to the air-conditioning control unit, information for setting an interval at which the air-conditioning control unit automatically transmits the running information and the operation setting information to the data control unit.

2. The air conditioner according to claim 1, further comprising a communication unit that performs transmission and reception of data between the data control unit and the data read and write unit in a bidirectional manner, wherein the data control unit stores the running information and the operation setting information received from the air-conditioning control unit in a storage file together with storage-date information, and the transmits the storage file to the data read and write unit via the communication unit, and the data read and write unit receives the storage file from the data control unit and writes the received file in the storage medium.

3. The air conditioner according to claim 2, wherein the operation unit transmits, to the air-conditioning control unit, an instruction for the air-conditioning control unit to cause the data read and write unit to read the running information and the operation setting information stored in the storage medium before stop of running, from the storage medium.

4. The air conditioner according to claim 2, wherein the air-conditioning control unit, the data control unit, the communication unit, and the data read and write unit are provided on the same control board.

5. The air conditioner according to claim 1, wherein the air-conditioning control unit stores the running information and the operation setting information in the nonvolatile memory on the same control board, and the storage medium is a physically separate medium from the nonvolatile memory.

* * * * *